US012731929B2

(12) United States Patent
Chen

(10) Patent No.: US 12,731,929 B2
(45) Date of Patent: Sep. 8, 2026

(54) ELECTRICAL CONNECTOR WITH IMPROVED POWER TERMINALS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 251 days.

(21) Appl. No.: 18/428,282

(22) Filed: Jan. 31, 2024

(65) Prior Publication Data

US 2024/0283180 A1 Aug. 22, 2024

(30) Foreign Application Priority Data

Feb. 16, 2023 (CN) ........................ 202320227498.X

(51) Int. Cl.
*H01R 13/02* (2006.01)
*H01R 13/42* (2006.01)
*H01R 13/502* (2006.01)

(52) U.S. Cl.
CPC ............. *H01R 13/02* (2013.01); *H01R 13/42* (2013.01); *H01R 13/502* (2013.01)

(58) Field of Classification Search
CPC ....... H01R 13/02; H01R 13/42; H01R 13/502
USPC .......................................................... 439/660
See application file for complete search history.

(56) References Cited

U.S. PATENT DOCUMENTS

| | | | |
|---|---|---|---|
| 6,652,322 | B2 | 11/2003 | Ito et al. |
| 6,672,886 | B2 | 1/2004 | Billman |
| 10,573,985 | B2 | 2/2020 | Hasegawa et al. |
| 10,673,181 | B2 | 6/2020 | Horii |
| 11,367,979 | B1 | 6/2022 | Huang |

(Continued)

FOREIGN PATENT DOCUMENTS

| | | | |
|---|---|---|---|
| CN | 208045747 | U | 11/2018 |
| CN | 112787138 | A | 5/2021 |

(Continued)

*Primary Examiner* — Tulsidas C Patel
*Assistant Examiner* — Jeffrey Mountain
(74) *Attorney, Agent, or Firm* — Ming Chieh Chang

(57) ABSTRACT

An electrical connector includes an insulating housing including two side walls and two end walls and an island portion, and two rows of first terminals, each row of first terminals including at least one power terminal and plural signal terminals, each power terminal including a base plate retained in the side wall and plural elastic arms extending from an upper edge of the base plate, each elastic arm successively including an upright portion, an upper connecting portion, a first contacting arm, a lower connecting portion, and a second contacting arm, the first contacting arm and the lower connecting portion and the second contacting arm being formed into substantially a U-shape and located between the side wall and the island portion, every adjacent elastic arms being unitarily formed with a first joining portion at the lower connecting portion.

15 Claims, 11 Drawing Sheets

(56) References Cited

U.S. PATENT DOCUMENTS

| | | | | |
|---|---|---|---|---|
| 2004/0014335 | A1* | 1/2004 | Igarashi | H01R 12/73<br>439/74 |
| 2009/0269987 | A1* | 10/2009 | Chen | H01R 13/20<br>439/656 |
| 2011/0028040 | A1* | 2/2011 | Wu | H01R 12/57<br>439/626 |
| 2016/0093967 | A1* | 3/2016 | Takenaga | H01R 12/716<br>439/660 |
| 2020/0335893 | A1* | 10/2020 | Chen | H01R 13/6585 |
| 2021/0376510 | A1* | 12/2021 | Obata | H01R 13/6597 |
| 2022/0247123 | A1* | 8/2022 | Chen | H01R 13/6273 |

FOREIGN PATENT DOCUMENTS

| | | | |
|---|---|---|---|
| CN | 107799948 | B | 6/2021 |
| CN | 113346285 | A | 9/2021 |
| CN | 218070236 | U | 12/2022 |
| EP | 3799216 | A1 | 3/2021 |
| JP | 5615157 | B2 | 10/2014 |
| JP | 2019033033 | A | 2/2019 |
| JP | 6928047 | B2 | 9/2021 |
| JP | 2022119669 | A | 8/2022 |

* cited by examiner

ELECTRICAL CONNECTOR WITH IMPROVED POWER TERMINALS

FIELD OF THE INVENTION

The present invention relates to an electrical connector including power terminals and signal terminals.

BACKGROUND OF THE INVENTION

U.S. Pat. No. 10,573,985 discloses an assembly including a floating plug connector and a mating receptacle connector. The floating plug connector includes plug signal terminals and plug power terminals. The plug power terminal includes a connecting portion, an inverted U-shaped insertion portions and a resilient portion that couples the connecting portion and the insertion portion. The resilient portion of the plug power terminal is divided into multiple narrow resilient portions with the help of slits formed in multiple locations. The receptacle power terminal includes a connecting portion, a contact portion and a middle resilient portion. Adjacent narrow resilient portions are designed to be spaced apart from each other throughout their entire extent in the longitudinal direction or, as an alternative, they may be partly interconnected in said longitudinal direction. It is noted that the receptacle power terminal is slim, that is, the middle resilient portions of the receptacle power terminals have substantial width with the contact portions and the connecting portion. During engagement of the two connectors, the power terminals of the receptacle connector may be a bottle neck of larger power current.

An improved electrical connector is desired.

SUMMARY OF THE INVENTION

The instant invention is to provide an electrical connector with improved power terminals.

To achieve the above-mentioned object, an electrical connector comprises: a longitudinal insulating housing comprising two side walls extending in a longitudinal direction and two end walls connecting two longitudinal ends of the side walls and an island portion among the side walls and the end walls; and two rows of first terminals arranged along the longitudinal direction of the insulating housing, each row of first terminals being positioned between corresponding side wall and the island portion, each row of first terminals comprising at least one power terminal and a plurality of signal terminals, each of the at least one power terminal comprising a base plate retained in the side wall and a plurality of elastic arms extending from an upper edge of the base plate, wherein each elastic arm successively comprises an upright portion, an upper connecting portion, a first contacting arm, a lower connecting portion, and a second contacting arm, the first contacting arm and the lower connecting portion and the second contacting arm are formed into substantially U-shaped and located between the side wall and the island portion, and every two adjacent elastic arms are unitarily formed with a respective first joining portion at the lower connecting portions.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
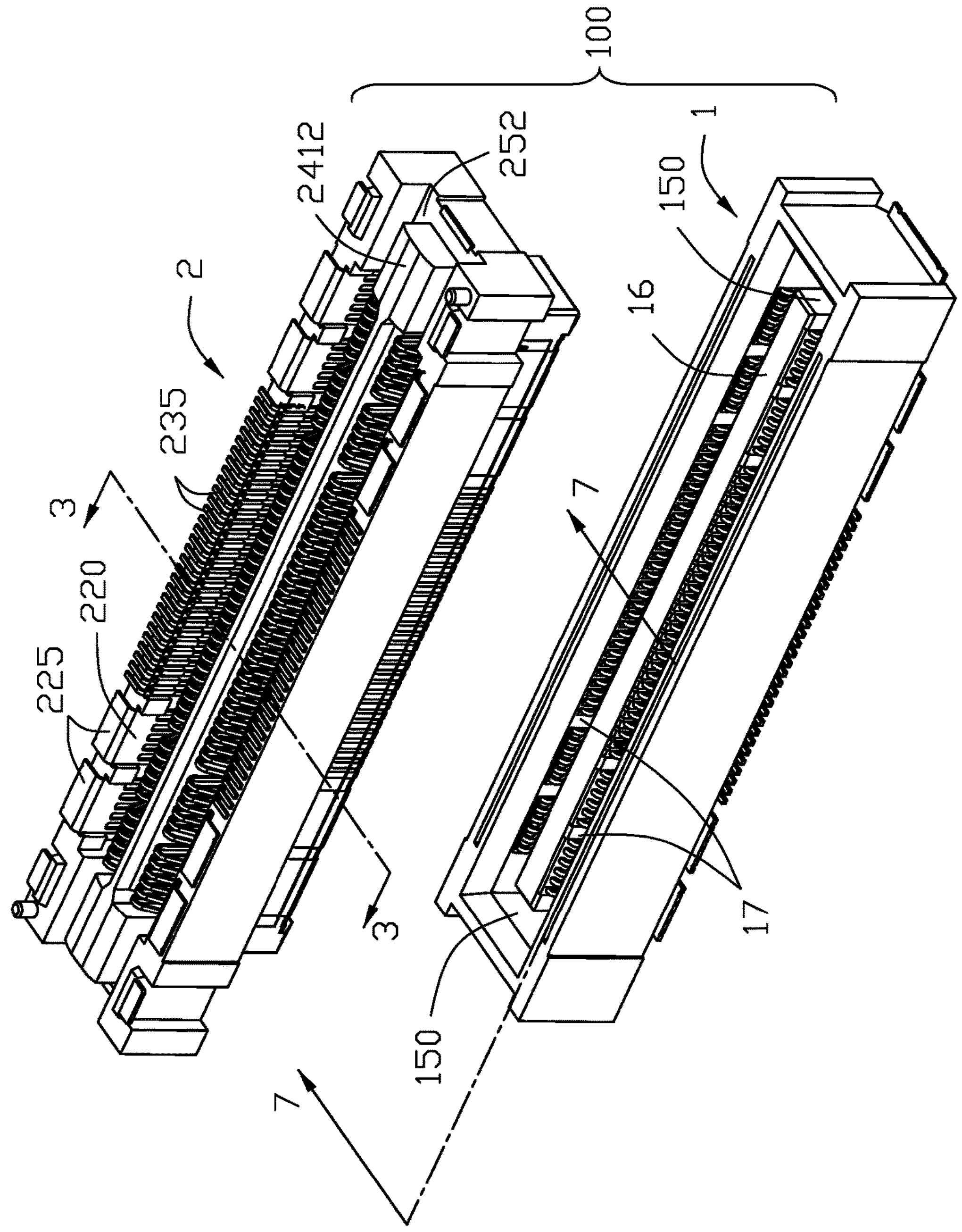
FIG. 1 is a perspective view of an electrical connector assembly in accordance with the present invention, which includes a first electrical connector and a second electrical connector disconnected from each other.
Figure 2:
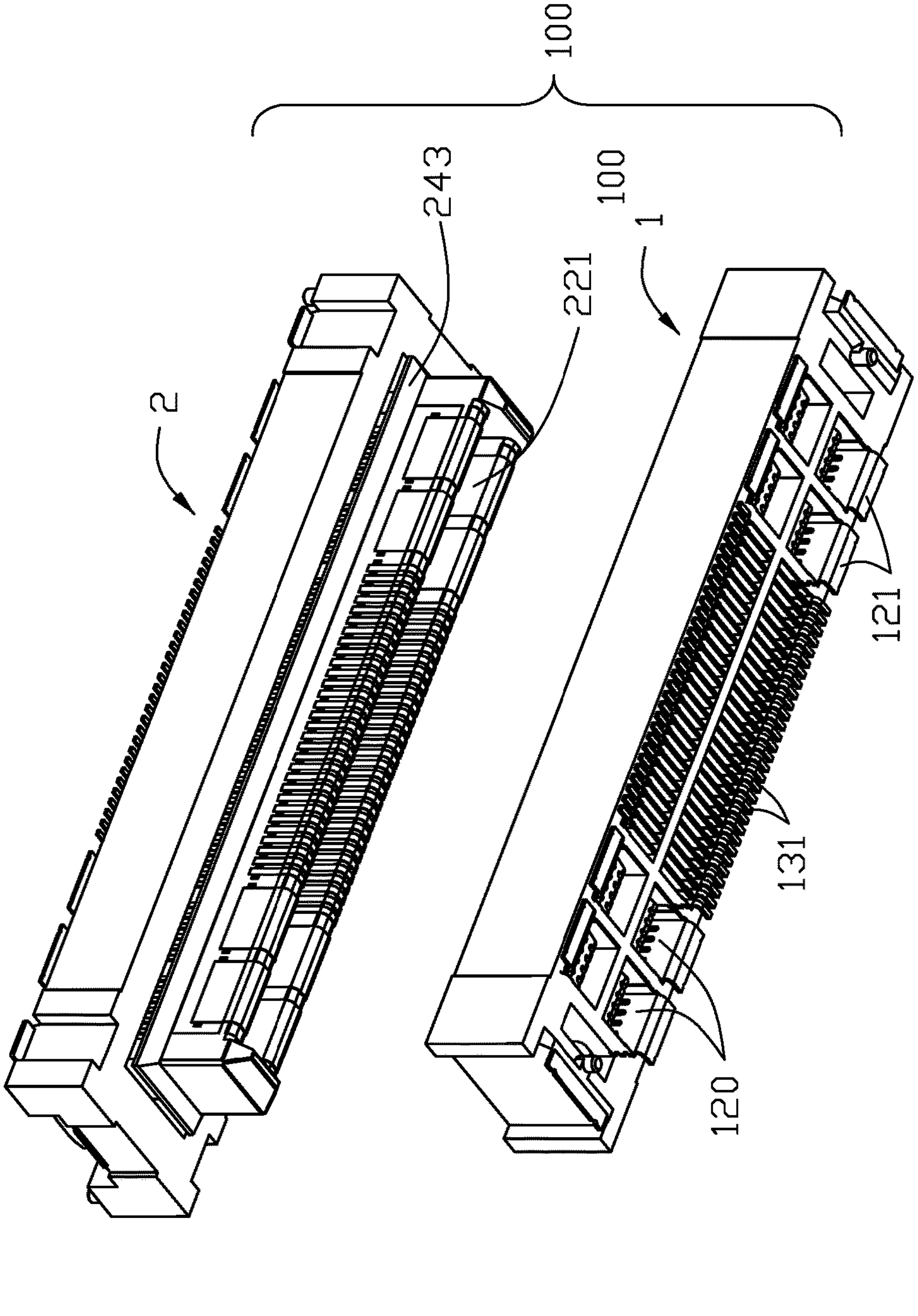
FIG. 2 is another perspective view of the electrical connector assembly in FIG. 1.

Reference will now be made in detail to the preferred embodiments of the present invention.

Referring to FIGS. 1-11, an electrical connector assembly 100 of a board to board type is illustrated, which include two mated electrical connectors, a first/female electrical connector 1 and a second/male electrical connector 2. The first electrical connector 1 includes a first insulating housing 10 and two rows of first terminals 11 retained in the first insulating housing. Each row of first terminals includes a plurality of first power terminals 12 and a plurality of first signal terminals 13. The second electrical connector 2 includes a second insulating housing 20 and two rows of second terminals 21, each row of second terminals 21 includes a plurality of second power terminals 22 and a plurality of second signal terminals 23. It is noted that first or second are used only to distinguish different elements, first or second can be omitted in case the description are clear.

Figure 3:
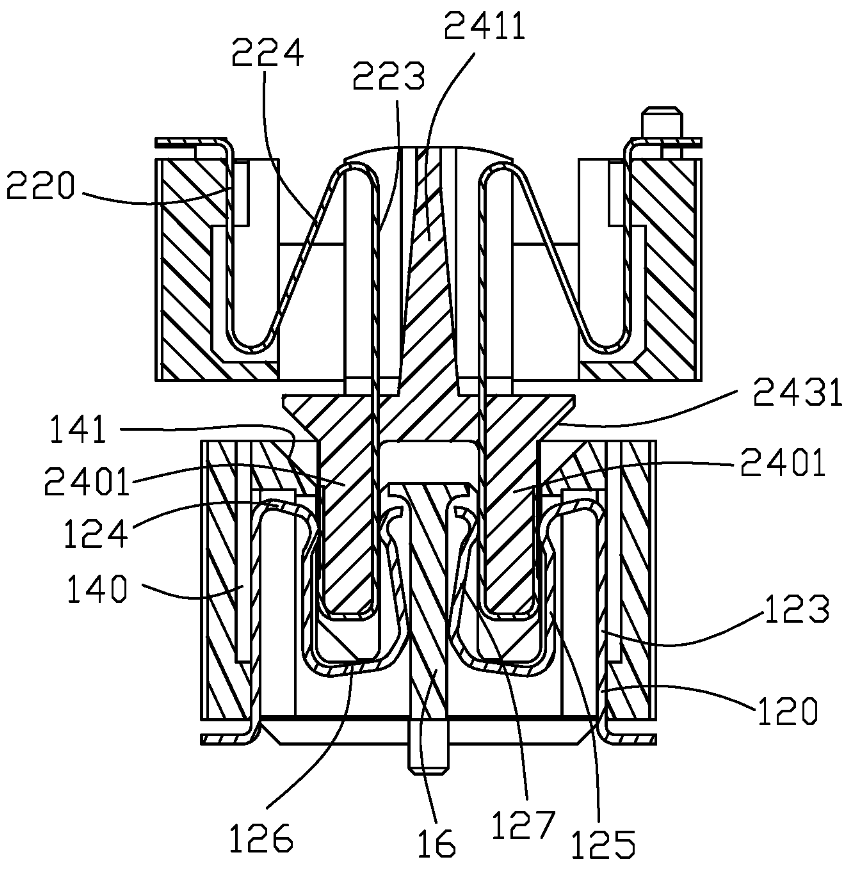
FIG. 3 is a cross-sectional view of the electrical connector assembly taken along a broken line in FIG. 1, wherein the two connectors are mated with each other.
Figure 4:
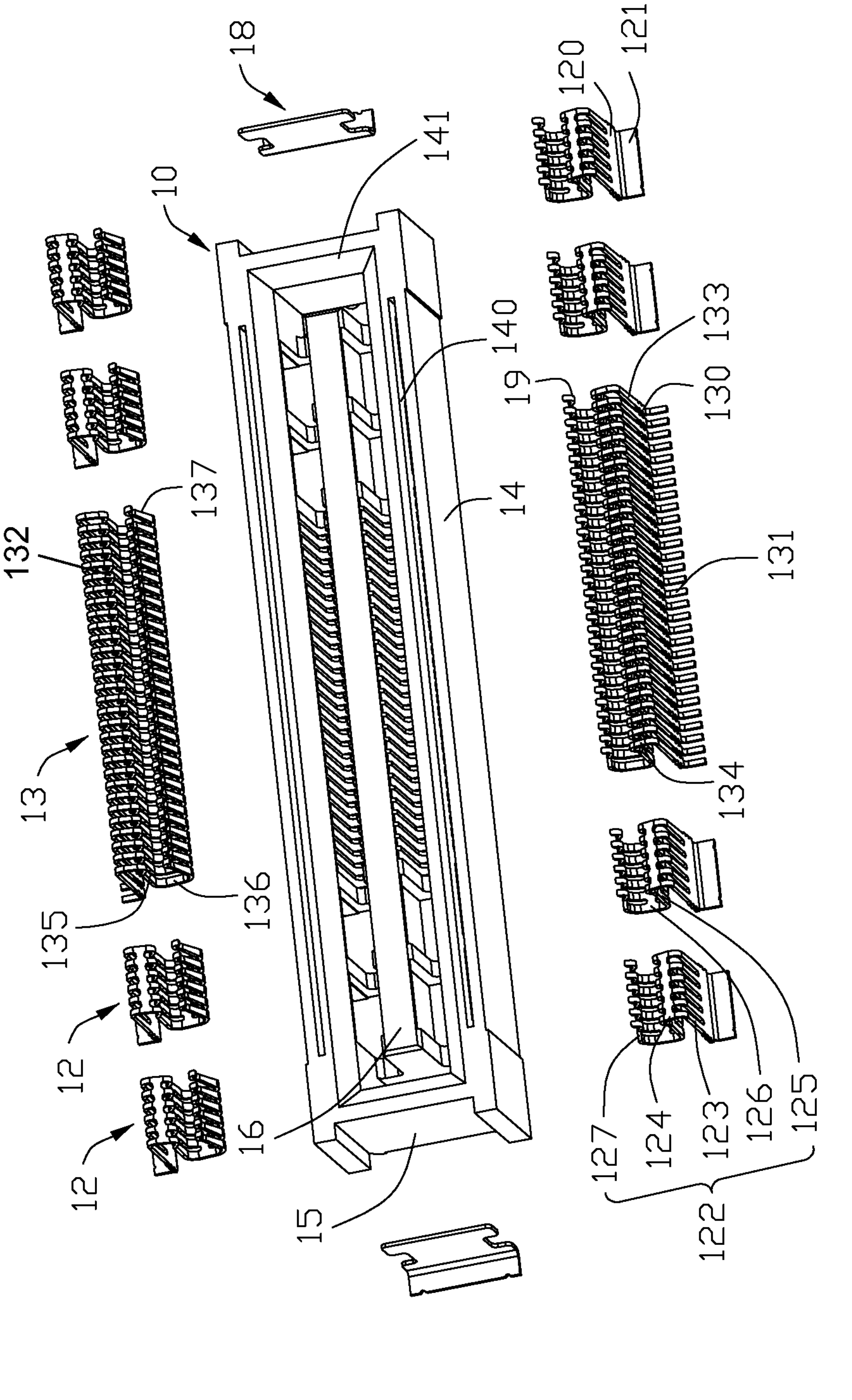
FIG. 4 is a top exploded perspective view of the first electrical connector in FIG. 1.

Referring to FIG. 4, the first insulating housing 10 is longitudinal and includes two side walls 14 extending in a longitudinal direction, two end walls 15 connecting with opposite longitudinal ends of the end walls 15, and an island portion 16 among said four walls. Each of the four walls has a guiding face 141 as clearly shown in FIGS. 3 and 4. As shown in FIG. 1, two long grooves 17 are defined between the island portion 16 and the side walls 14 and two short grooves 150 are defined between the island portion 16 and the end walls 15. Each row of the first terminals are arranged along a longitudinal direction of the first insulating housing 10, and comprises a plurality of first power terminals 12 and a plurality of first signal terminals 13. In this embodiment, the two first power terminals 12 are located at each longitudinal end of the row of first signal terminals 13.

Figure 5:
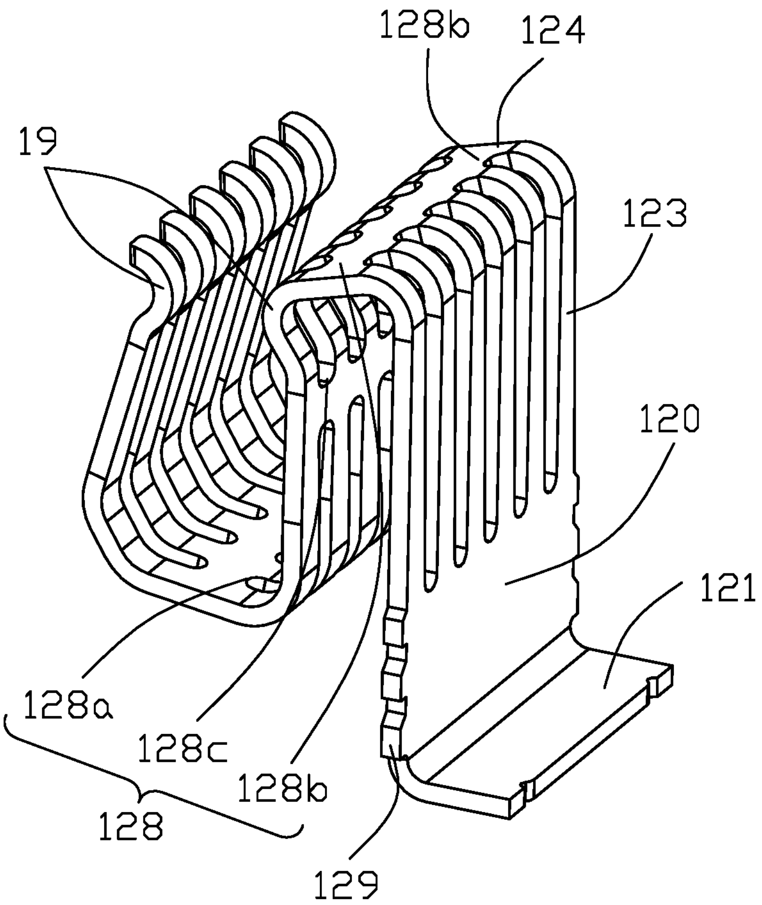
FIG. 5 is a top perspective view of a first power terminal in FIG. 4.
Figure 6:
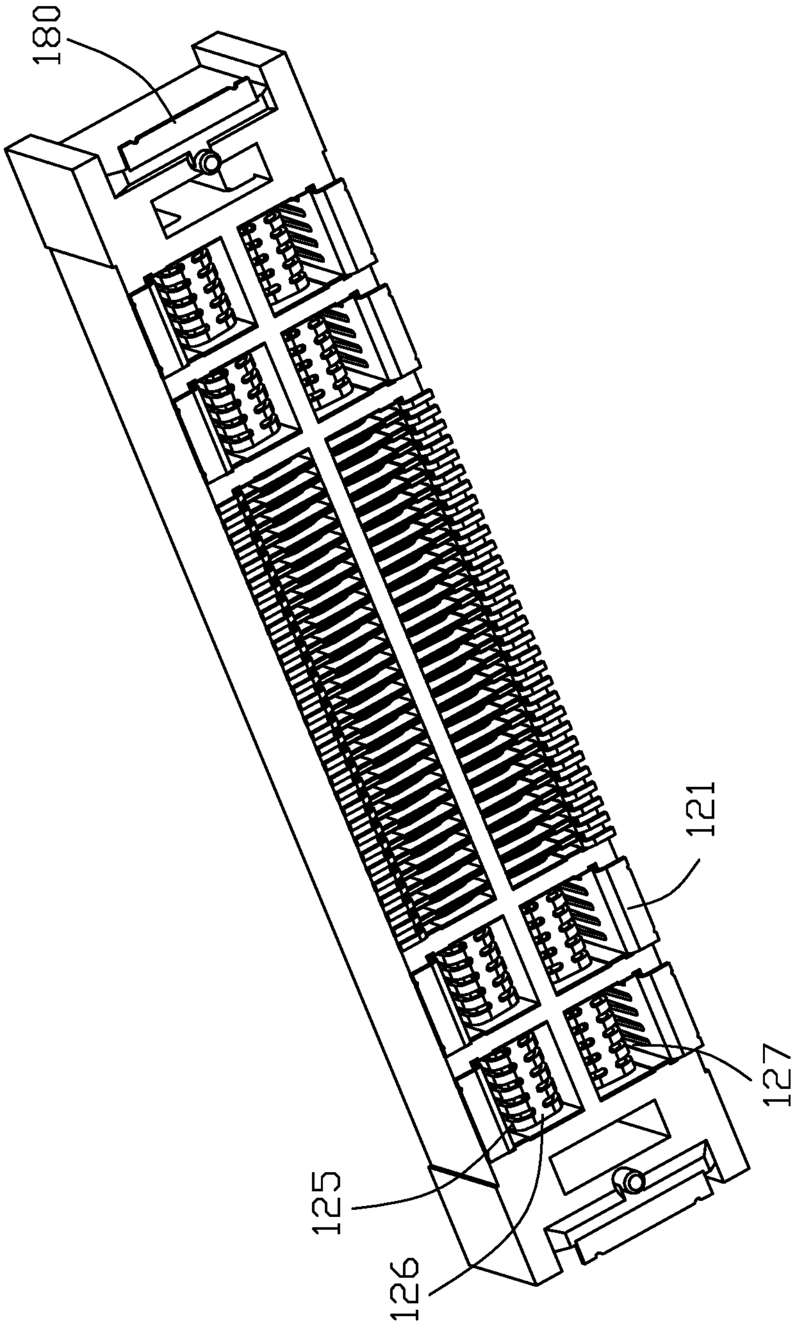
FIG. 6 is a bottom perspective view of the first electrical connector in FIG. 4.

Referring to FIGS. 4-7, each of the first power terminal 12 includes a base plate 120 with barbs 129 at opposite longitudinal edges thereof, a soldering plate 121 extending from a lower edge of the base plate 120 and a plurality of elastic arms 122 extending from an upper edge of the base plate 120. The elastic arms 122 are movable from the insulating housing and separate from each other at same intervals. The adjacent elastic arms 122 are further united with joining portions 128. The joining portions 128 increase the quantity of current path, keep the elastic arms 122 with same intervals. The elastic arm 122 successively includes an upright portion 123 extending from the base plate 120, an upper connecting portion 124, a first contacting arm 125, a lower connecting portion 126 and a second contacting arm 127 in turn, the first and the second contacting arms have contacting portions 19 protruding towards each other, adapted for mating with the second power terminals 22. Referring to FIG. 5, first joining portions 128*a* connect adjacent two lower connecting portions 126, the first connecting portions 128*a* keep the elastic arms with same intervals and increase the power current when the two connectors are mated with each other. Second joining portions 128*b* connect the adjacent upper connecting portions 124, third joining portions 128*c* are located at the first contacting arms 125. The third joining portions 128*c* proximate to the contacting portions 19 of the first contacting arms 125. The soldering plate 121 is of one piece. Each power terminal 12 is of a one piece, which benefit to assembly.

Referring to FIG. 3, the first contacting arm 125, the lower connecting portion 126 and the second contacting arms 127 of the first power terminals 12 form a U shape and extend into the long grooves 17. The second contacting arms 127 are located at the island portion 16; the first contacting arms 125 are located at the side walls 14. The row of first signal terminals 13 is located between the first power terminals 12. The first signal terminals 13 are similar to the first power terminals 12 except the base plate 120 and the solder plate 121. The first power terminals 12 and the first signal terminals 13 are overlapped viewed in the longitudinal direction. The first signal terminal 13 includes a base portion 130 retained in the first housing, a soldering portion 131 extending downward from the base portion 130, and an elastic arm 132 extending upwards from the base portion 130. The signal terminals 13 are arranged at same intervals. The elastic arm 132 successively includes an upright portion 133, an upper connecting portion 134 and a first contacting arm 135, a lower connecting portion 136 and a second contacting arm 137. The first contacting arms 135 and the lower connecting portions 136 and the second contacting arms 137 extend into the long groove 17. The top ends of the second contacting arms 127, 137 are located below the top face of the island portion 16. The elastic arms 132 correspond to the base portions 130 one by one.

Figure 7:
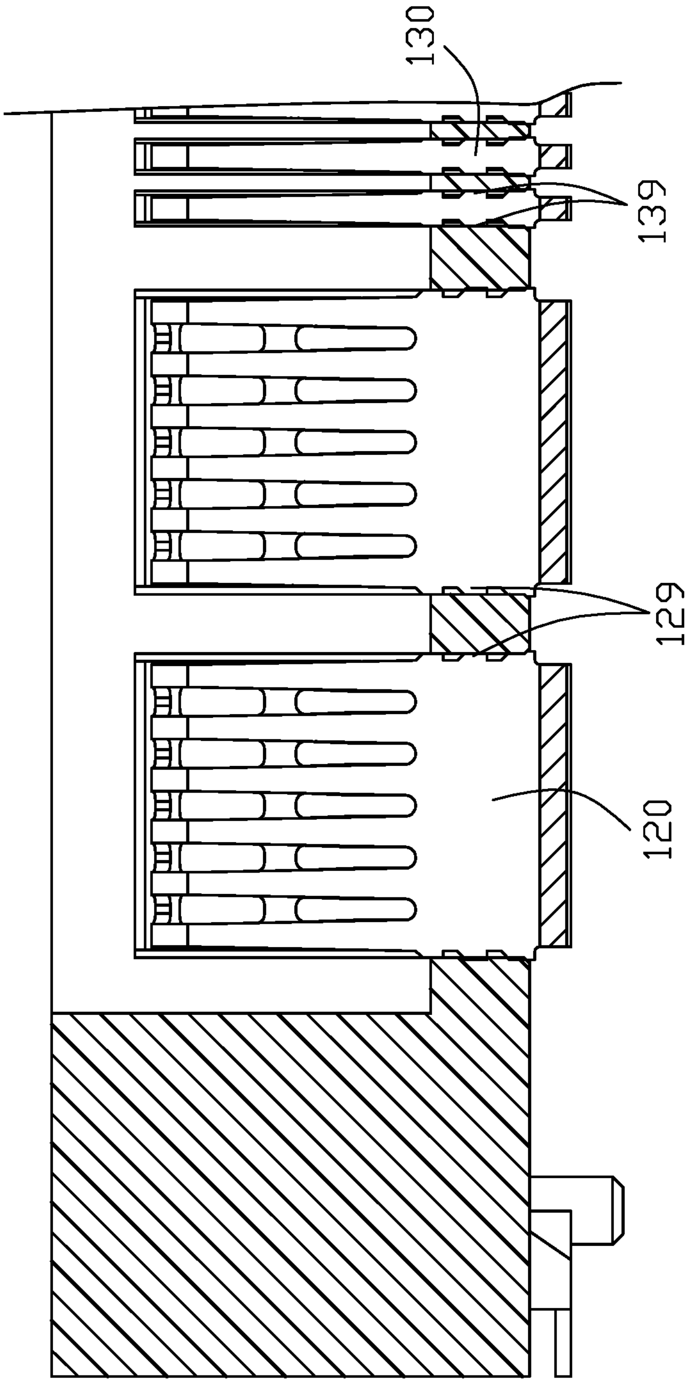
FIG. 7 is a cross-sectional view of part of the first electrical connector taken along a broken line 7-7 in FIG. 1.

Referring to FIG. 7, two opposite edges of the base plate 120 and the base portions 130 define barbs 129, 139 to interfere with the first insulating housing 10. The first power terminals 12 and the first signal terminals 13 are assembled upwards from a bottom of first insulating housing 10 and retained with the first insulating housing 10 by the barbs 129, 139. The long grooves 17 are located at opposite sides of the island portion 16, and located with two rows of first terminals. Each of the side walls 14 define a long slit 140 recessed from the top face thereof, the long slit 140 and the corresponding long groove 17 are connected with each other, thereby providing more shifting room for the elastic arms 122, 132. During an engagement of the two connectors, the elastic arms 122, 132 shift to adjust the position of the terminals. A pair of retained pieces 18 is retained at longitudinal ends of the first insulating housing 10 by an injection molded process, and soldering portions 180 extend from the retaining pieces 18 to be soldered to a circuit board on which the first electrical connector 1 is mounted. The first terminals are then assembled into the first insulating housing 10.

Figure 8:
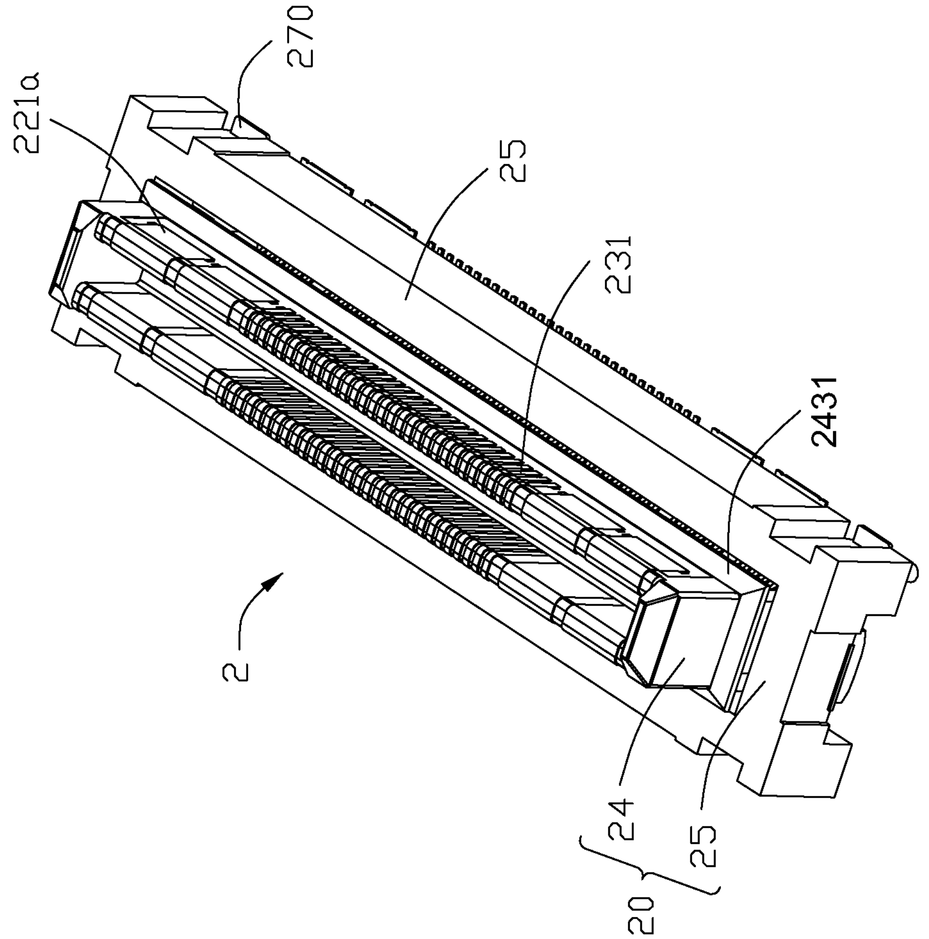
FIG. 8 is a perspective view of the second electrical connector in FIG. 1.
Figure 9:
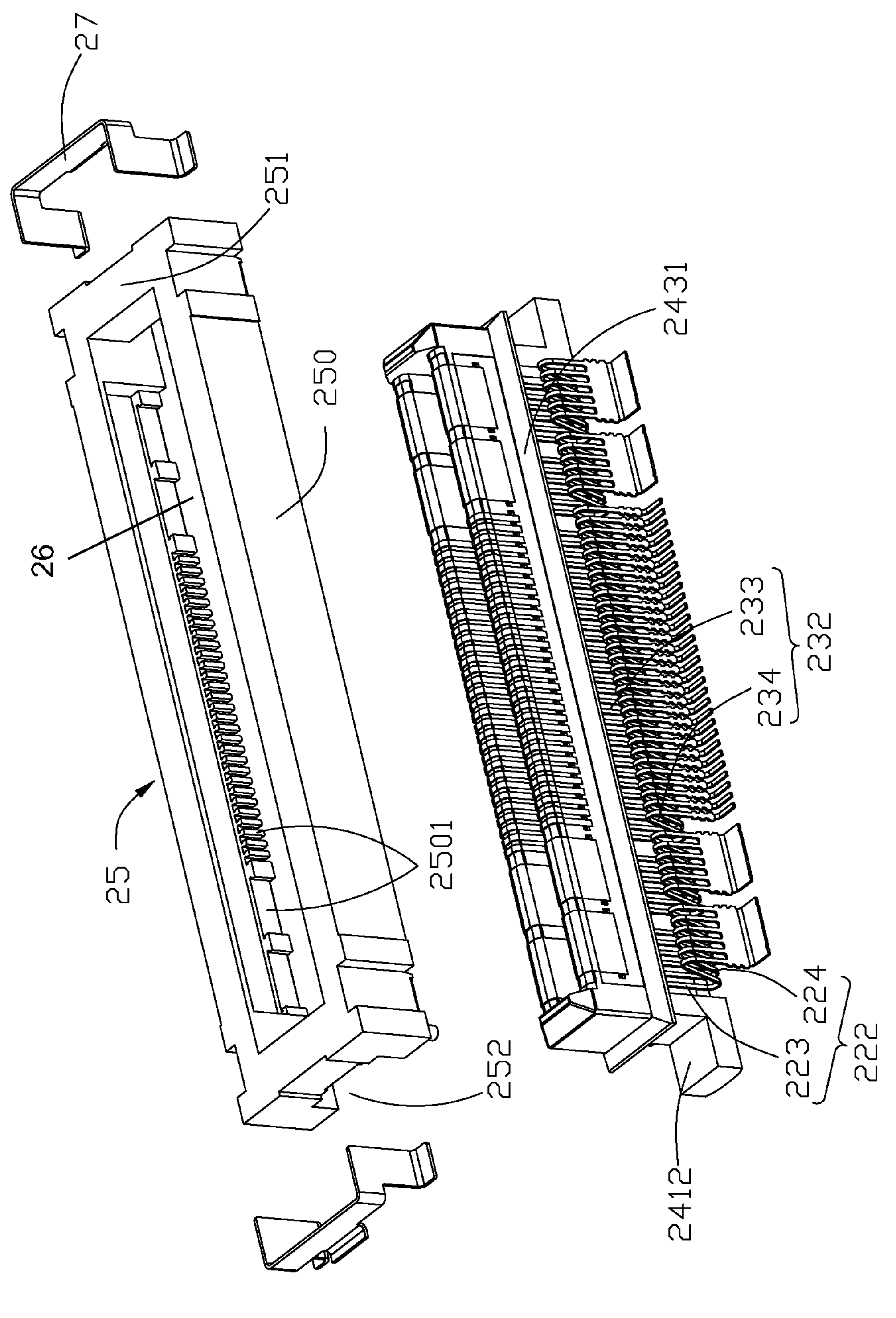
FIG. 9 is a top exploded perspective view of the second electrical connector in FIG. 8.
Figure 10:
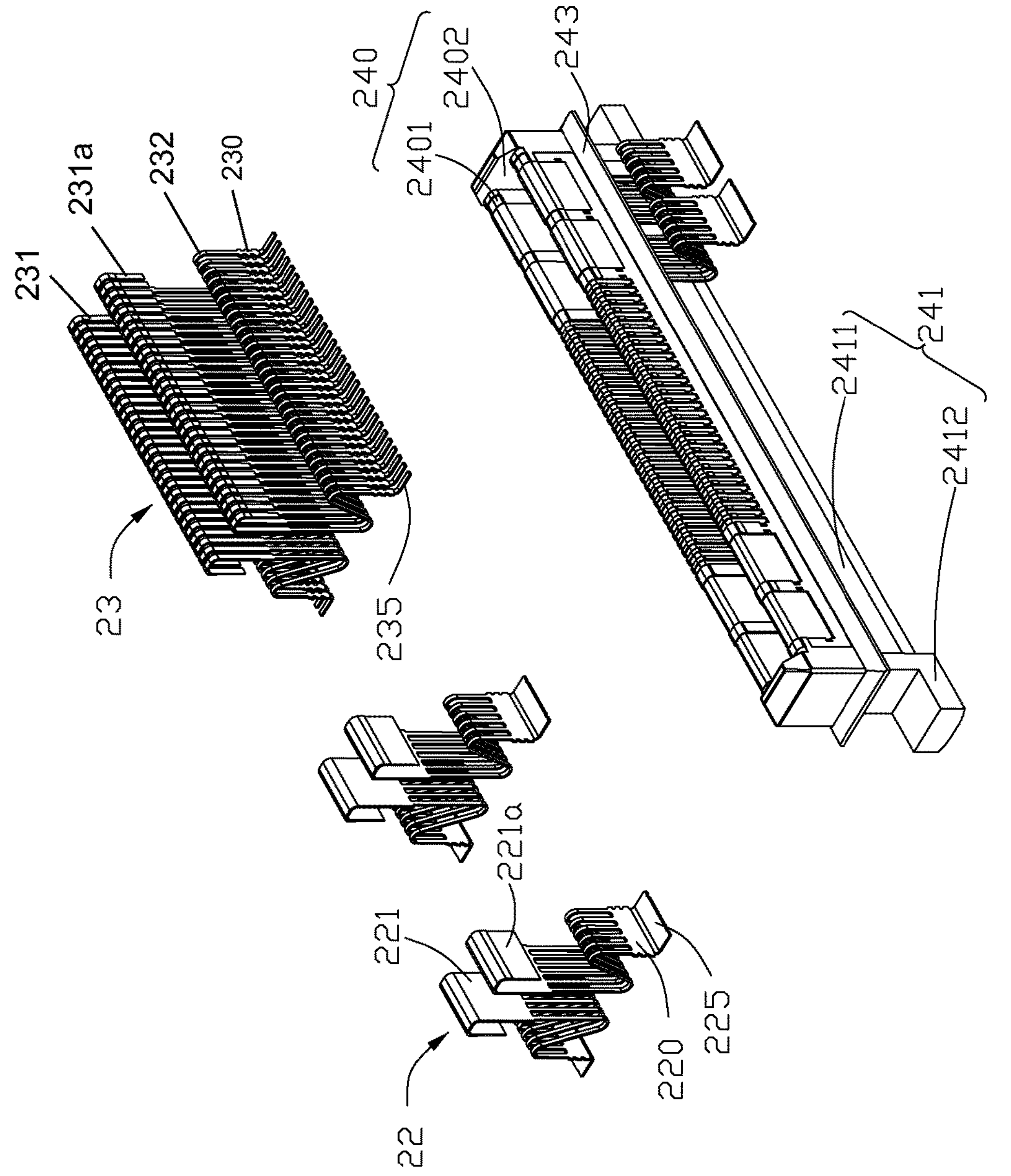
FIG. 10 is a top exploded perspective view of second terminals and a first housing of the second electrical connector in FIG. 9.
Figure 11:
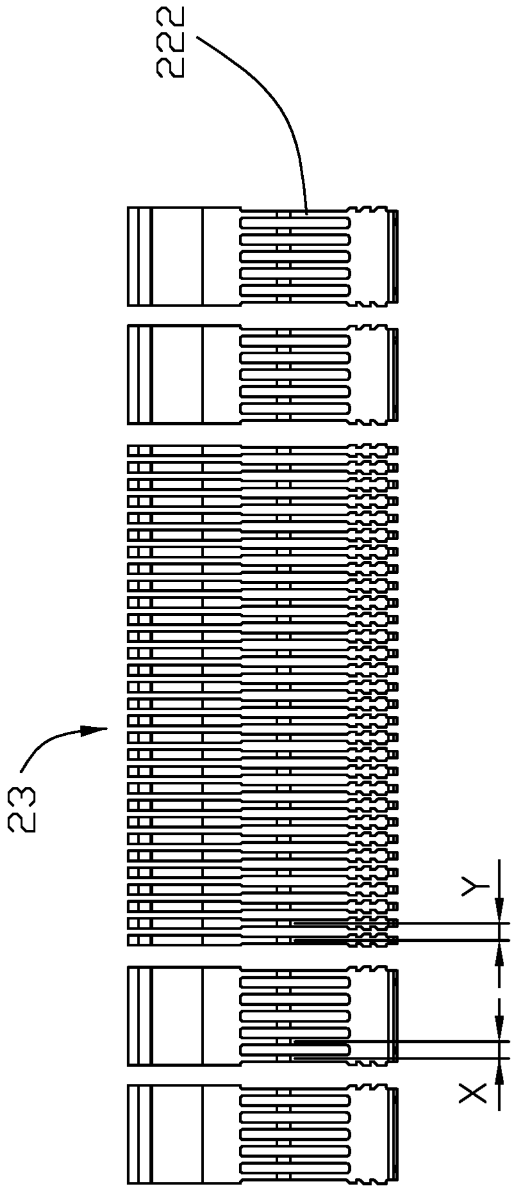
FIG. 11 is a front view of a row of second terminals.

Referring to FIGS. 8-10, each of the second power terminals 22 of the second electrical connector 2 includes a base plate 220 retained in the second insulating housing 20, a first contacting plate 221 and a second contacting plate 221*a*. The base plate 220 and the first contacting plate 221 are connected with multiple elastic arms 222. As shown in FIG. 11, the elastic arms 222 are arranged at intervals with a first distance X, the second signal terminals 23 are arranged with at intervals with a second distance Y. The second distance Y equals to the first distance X. It is noted that a distance between the central axis of two adjacent elastic arms is defined as the first distance X, a distance between the central axis of two adjacent second signal terminals 23 is defined as the second distance Y.

As shown in FIGS. 8-9, the second insulating housing 20 includes a first housing 24 and a second housing 25 assembled together, the base plate 220 are retained in the second housing 25 as shown in FIG. 3, the first and second contacting plates 221, 221*a* are retained in the first housing 24. The first housing 24 includes a mating portion 240 at an upper half portion thereof and a supporting portion 241 at a lower half portion. The mating portion 240 is configured with two mating tongues 2401 and two end tongues 2402 inserted into the long grooves 17 and the short grooves 150, the first and contacting plates 221, 221*a* are embedded in the mating tongues 2401. A mating slot 2403 is defined among the mating tongue 2401 and the end tongue 2402. The supporting portion 241 includes a longitudinal middle portion 2411 and two bulge portions 2412 connecting with the middle portion 2411. The first and second contacting portions 221, 221*a* are embedded in mating tongue 2401 by an injection molded process. The other portions of the second terminals exposes at opposite sides of the middle portion 2411. Two retaining pieces 27 are retained in the second housing 25 during an injection molded process of the first housing. The retaining pieces 27 have soldering portions 270. A limited portion 243 is defined between the mating portion 240 and the supporting portion 241. The limited portion 243 is located around the mating tongue 240 and projects outwards, which has a slantwise upper face 2431. The second housing 25 includes two side portions 250 and the two end portions 251 connected in order and forms a receiving room 26. The second housing 25 is assembled downward and into the first housing 24, the second housing 25 goes across the limited portion 243 and then the end portions 251 are located between the limited portions 243 and the end portions 2412. The base portions 220 of the second terminals are inserted into and retained in the passageways 2501 defined in the second housing 25. Therefore, the supporting portion 241 is received in the receiving room 26 but separates from the side portions 250 and the end portions 251 with a slight gap. The end portions 251 of the second housing 25 defines grooves 252 at bottom faces thereof, which runs through in the longitudinal direction, the bulge portions 2412 in an L shape extend outwards along the longitudinal direction and are received in the grooves 252, to further limit the movement of the second housing 25 related to the first housing 24 in the upright direction. Soldering portions 225 extend from the base portions 220 of the second power terminal, which extend out of the side portions 250. The elastic arms 222 expose to the space among the middle portion 2411 of the first housing 24 and side portions 250 of the second housing 25. The second contacting plates 221*a* fold downwards and abut against the top face of the mating portions 2401. As best shown in FIGS. 3 and 9, the elastic arm 222 of the second power terminal 22 has a slant section 224 and an upright section 223.

The second signal terminals 23 and the second power terminals 22, as shown in FIGS. 9 and 10, are overlapped as viewed in the longitudinal direction. The signal terminal 23 includes a base portion 230 retained in the second housing 25, a first contacting section 231 and a second contacting portion 231*a* retained in the first housing 24, an elastic arm 232 exposed to the space among the middle portion 2401 and the side portion 250, and a soldering portion 235. The elastic arms correspond to the contacting portions and the soldering portions one by one. The elastic arm 232 of the second signal terminal 23 has a slant section 234 and an upright section 233. Referring to FIG. 3, the first housing 24 is movable in the longitudinal direction and a transverse direction, since the first housing 24 has widths thereof smaller than widths of the supporting portion 241.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:
- a longitudinal insulating housing comprising two side walls extending in a longitudinal direction and two end walls connecting two longitudinal ends of the side walls and an island portion among the side walls and the end walls; and
- two rows of first terminals arranged along the longitudinal direction of the insulating housing, each row of first terminals being positioned between corresponding side wall and the island portion, each row of first terminals comprising at least one power terminal and a plurality of signal terminals, each of the at least one power terminal comprising a base plate retained in the side wall and a plurality of elastic arms extending from an upper edge of the base plate;
- wherein each elastic arm successively comprises an upright portion, an upper connecting portion, a first contacting arm, a lower connecting portion, and a second contacting arm, the first contacting arm and the lower connecting portion and the second contacting arm are formed into substantially U-shaped and located between the side wall and the island portion, and every two adjacent elastic arms are unitarily formed with a respective first joining portion at the lower connecting portions.

2. The electrical connector as claimed in claim 1, wherein every two adjacent elastic arms are unitarily formed with a respective second joining portion at the upper connecting portions.

3. The electrical connector as claimed in claim 2, wherein every two adjacent elastic arms are unitarily formed with a respective third joining portion at the second contacting arms.

4. The electrical connector as claimed in claim 3, wherein each of the first contacting arms has a contacting portion raised towards the second contacting arms, and each of the second contacting arms has a contacting portion arcing towards the first contacting arms.

5. The electrical connector as claimed in claim 4, wherein the contacting portions of the first contacting arms are located above the third joining portions.

6. The electrical connector as claimed in claim 1, wherein a soldering plate extends from a lower edge of the base plate.

7. The electrical connector as claimed in claim 1, wherein two power terminals are arranged at each longitudinal end of each side wall.

8. The electrical connector as claimed in claim 1, wherein each of the first signal terminals comprises a base portion retained in the side wall, an elastic arm extending from an upper edge of the base portion, and a soldering portion extending from a lower edge of the base portion, the elastic portion corresponding to the base portion one by one.

9. The coaxial connector as claimed in claim 1, wherein each of the side walls defines a long slit recessed from a top face thereof, and the long slit and the corresponding long groove are connected with each other to provide more shifting room for the elastic arms.

10. An electrical connector assembly comprising:
- a first electrical connector comprising:
  - a first insulating housing; and
  - a row of first terminals retained in the first insulating housing and comprising a plurality of first power terminals and a plurality of first signal terminals, the first power terminal comprising a longitudinal base plate retained in the first insulating housing and a plurality of elastic arms extending from an upper edge of the base plate; and
- a second electrical connector adapted for mating with the first electrical connector, comprising:
  - a second insulating housing; and
  - a row of second terminals retained in the second insulating housing and comprising a plurality of second power terminals and a plurality of second signal terminals, the second power terminal comprising a base plate retained in the second insulating housing, a first contacting plate retained in the second insulating housing, and a plurality of elastic arms connecting between the base plate and the first contacting plate;
  - wherein the elastic arms of the second power terminal are disposed at intervals with a first distance, the second signal terminal are disposed at intervals with a second distance, the second distance being equal to the first distance.

11. The electrical connector assembly as claimed in claim 10, wherein the second insulating housing comprises a first housing and a second housing assembled together, the base plates of the second power terminals are retained in the second housing, and the first contacting plates are retained in the first housing.

12. The electrical connector assembly as claimed in claim 10, wherein the first power terminal successively comprises an upright portion, an upper connecting portion, a first contacting arm, a lower connecting portion, and a second contacting arms, and every two adjacent elastic arms of the first power terminal are unitarily formed with a respective first joining portion.

13. An electrical connector comprising:
- an insulating housing; and
- at least one power terminal, each of the at least one power terminal comprising a base plate retained in the insulating housing and a plurality of elastic arms extending from the base plate with contacting portions, the elastic arms being movable relative to the insulating housing;
- wherein every two adjacent elastic arms of the at least one power terminal is unitarily formed with a respective first joining portion.

14. The electrical connector as claimed in claim 13, wherein the first joining portions are located near the base plate.

15. The electrical connector as claimed in claim 14, wherein every two adjacent elastic arms of the at least one power terminal is unitarily formed with a respective second joining portion, and the second joining portions are located near the contacting portions.

* * * * *